US012792836B2

(12) United States Patent

Arthur et al.

(10) Patent No.: US 12,792,836 B2

(45) **Date of Patent: *Nov. 10, 2026**

(54) IDENTIFYING MULTIMEDIA ASSET SIMILARITY USING BLENDED SEMANTIC AND LATENT FEATURE ANALYSIS

(71) Applicant: Adeia Media Solutions Inc., San Jose, CA (US)

(72) Inventors: David Arthur, Wake Forest, NC (US); Doug Mittendorf, Cary, NC (US)

(73) Assignee: Adeia Media Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,140

(22) Filed: Feb. 29, 2024

(65) Prior Publication Data

US 2024/0202455 A1 Jun. 20, 2024

Related U.S. Application Data

(63) Continuation of application No. 18/093,924, filed on Jan. 6, 2023, now Pat. No. 12,223,280, which is a (Continued)

(51) Int. Cl.

*G06F 40/30* (2020.01)
*G06F 16/41* (2019.01)
(Continued)

(52) U.S. Cl.

CPC .............. *G06F 40/30* (2020.01); *G06F 16/41* (2019.01); *G06F 16/43* (2019.01); *G06F 16/489* (2019.01)

(58) Field of Classification Search

None

See application file for complete search history.

(56) References Cited

U.S. PATENT DOCUMENTS 6,615,208 B1 9/2003 Behrens et al.
7,328,216 B2 2/2008 Hofmann et al.
(Continued)

FOREIGN PATENT DOCUMENTS

WO 2010123264 A2 10/2010

OTHER PUBLICATIONS

Jie Tang; A Combination Approach to Web User Profiling; ACM; pp. 1-44 (Year: 2010).*

(Continued)

*Primary Examiner* — Ann J Lo
*Assistant Examiner* — Jermaine A Mincey
(74) *Attorney, Agent, or Firm* — HG Law LLP

(57) ABSTRACT

Methods and system for determining a similarity relationship between a plurality of digital assets and a target digital asset comprises creating a normalized semantic feature vector associated with a search query, discovering the target asset based on the normalized semantic feature vector, generating a normalized latent feature vector associated with the target asset, comparing the normalized semantic feature vector with semantic feature vectors for each of the digital assets to generate a semantic comparison value, comparing the normalized target latent feature vector with latent feature vectors for each of the digital assets to generate a latent comparison value, blending the semantic comparison vector value with the latent feature comparison vector value to create a target comparison value for each of the digital assets, and reporting the digital assets having the highest target comparison values to the user or group of users.

20 Claims, 6 Drawing Sheets

Related U.S. Application Data continuation of application No. 16/419,547, filed on May 22, 2019, now Pat. No. 11,580,306, which is a continuation of application No. 13/778,771, filed on Feb. 27, 2013, now Pat. No. 10,331,785.

(51) Int. Cl.

| | |
|---|---|
| ***G06F 16/43*** | (2019.01) |
| ***G06F 16/45*** | (2019.01) |
| ***G06F 16/48*** | (2019.01) |

(56) References Cited

U.S. PATENT DOCUMENTS

| | | | | |
|---|---|---|---|---|
| 7,752,204 | B2 | 7/2010 | Kao et al. | |
| 8,543,454 | B2 | 9/2013 | Fleischman et al. | |
| 8,781,231 | B1 * | 7/2014 | Kumar | G06F 18/2323 382/172 |
| 8,805,854 | B2 | 8/2014 | Chen et al. | |
| 9,195,640 | B1 | 11/2015 | Donneau-Golencer et al. | |
| 9,454,530 | B2 * | 9/2016 | Sabah | G06F 16/435 |
| 11,580,306 | B2 | 2/2023 | Arthur et al. | |
| 2002/0184229 | A1 | 12/2002 | Moghaddam et al. | |
| 2003/0033287 | A1 * | 2/2003 | Shanahan | G06F 16/93 |
| 2005/0086210 | A1 | 4/2005 | Kita et al. | |
| 2005/0187975 | A1 | 8/2005 | Yamane | |
| 2007/0260704 | A1 | 11/2007 | Sagoo et al. | |
| 2009/0089162 | A1 | 4/2009 | Davis et al. | |
| 2009/0208106 | A1 | 8/2009 | Dunlop et al. | |
| 2009/0248599 | A1 * | 10/2009 | Hueter | G06Q 30/0631 706/15 |
| 2009/0313227 | A1 | 12/2009 | Dunning et al. | |
| 2010/0082644 | A1 | 4/2010 | Ly et al. | |
| 2010/0235313 | A1 | 9/2010 | Rea et al. | |
| 2010/0287159 | A1 | 11/2010 | Abajian et al. | |
| 2012/0030159 | A1 * | 2/2012 | Pilaszy | G06Q 10/00 706/46 |
| 2012/0265736 | A1 * | 10/2012 | Williams | G06F 40/242 707/E17.002 |
| 2013/0290110 | A1 * | 10/2013 | LuVogt | G06F 16/9535 705/14.66 |
| 2014/0181121 | A1 | 6/2014 | Nice et al. | |
| 2019/0179858 | A1 | 6/2019 | Douze et al. | |
| 2019/0272326 | A1 | 9/2019 | Arthur et al. | |
| 2023/0161967 | A1 | 5/2023 | Arthur et al. | |
| 2024/0202456 | A1 | 6/2024 | Arthur et al. | |

OTHER PUBLICATIONS

U.S. Appl. No. 18/093,924, filed Jan. 6, 2023, David Arthur.

U.S. Appl. No. 18/592,150, filed Feb. 29, 2024, David Arthur.

1 Rocha et al., "A Hybrid Approach for Searching in the Sematic Web," WWWWW 2004, May 17-22, 2004 (10 pages).

Flank et al., "Method and apparatus for digital media management, retrieval, and collaboration (English)," IP.com, pp. 1-39 (2002).

Sugiyama et al., "Adaptive Web Search Based on User Profile Constructed without Any Effort from Users," ACM 1-58113-844-X/04/0005 (2004) (10 Pages).

Haas, et al., "Enhanced Results for Web Search," www.microformats.org, pp. 725-734 (2011).

* cited by examiner

500

IDENTIFYING MULTIMEDIA ASSET SIMILARITY USING BLENDED SEMANTIC AND LATENT FEATURE ANALYSIS

CROSS REFERENCE TO RELATED APPLICATION

This application is a continuation of U.S. patent application Ser. No. 18/093,924, filed Jan. 6, 2023, which is a continuation of U.S. patent application Ser. No. 16/419,547, filed May 22, 2019, now U.S. Pat. No. 11,580,306, which is a continuation of U.S. patent application Ser. No. 13/778,771, filed Feb. 27, 2013, now U.S. Pat. No. 10,331,785, which claims the benefit under 35 U.S.C. § 119 (e) of U.S. Provisional Patent Application No. 61/600,186, entitled "Item Similarity Discovery Using Metadata," filed Feb. 17, 2012. The disclosures of which are hereby incorporated herein by reference herein in its entirety their respective entireties.

FIELD OF THE PRESENT INVENTION

The present inventions relate generally to the navigation and searching of digital media. More particularly, the disclosed computer-implemented systems and methods determine a similarity relationship between each of a plurality of multimedia digital assets with reference to a target multimedia digital asset or search query based on blended analysis of semantic and latent features associated with the digital assets and then report to a user or group of users the multimedia digital assets that are most similar to the target multimedia digital asset or most responsive to the search query.

BACKGROUND OF THE PRESENT INVENTION

The Internet has made numerous forms of content available to users across the world. For example, consumers access the Internet to view articles, research topics of interest, watch videos, and the like. In particular, online viewing of digital media has become extremely popular in recent years.

Yet further, the growing prominence and value of digital media, including the libraries of full-featured films, digital shorts, television series and programs, news programs, and similar professionally (and amateur) made multimedia (previously and hereinafter referred to generally as "digital media," "multimedia digital assets," "multimedia," "videos," "assets," "files," "content," or any combination of such terms), requires effective and convenient manners of navigating, searching, and retrieving such digital media.

Sometimes when searching, users are willing just to browse through broad categories or genres of videos until they find an asset of potential interest. However, sorting through all available videos to find content that may be of greater interest to a specific user is becoming more and more unwieldy and difficult—especially as the number of content sources and the sheer amount of available content increases. Going forward, users are more likely to want to browse through a more targeted or selected subset of available videos, TV shows, movies, or other multimedia assets. Thus, being able to generate and present a targeted subset of assets that are more likely to be of greater interest to a user or group of users is desirable.

"Metadata," which is a term that is used herein, is merely information about other information—in this case, information about digital media. For example, metadata may just refer to keywords or terms that identify basic information or characteristics associated with a particular digital media asset, including but not limited to actors appearing, characters appearing, dialog, subject matter, genre, setting, location, or themes presented in the particular digital media asset. Metadata may be related to the digital media asset as a whole (such as the title, date of creation, director, producer, production studio, MPAA or similar content rating, etc.) or may only be relevant to particular scenes, images, audio, or other portions of the digital media asset. Metadata related to digital media assets as a whole are commonly available. However, rich or time-based metadata that is associated with discrete portions or segments of digital media assets are not as readily available, but provide significant value and enable much more accurate searching and analysis of video content.

Typical video search engines, such as the Internet Movie Database (IMDB®), rely upon basic keywords or terms that are related to the digital media asset as a whole. If a term or keyword has been associated with a video, then that video will be returned as a possibly-relevant response to a user search query that contains matching terms or keywords—this is a basic "semantic" type of search that presents the result of information retrieval based on metadata. Ranking of the videos returned in response to the search query can be determined in many different ways: by date, alphabetically by title, by greater number of matches between the search terms and the keywords, by the order such keywords are arranged (presumably by order of importance) in the metadata, or if such keywords are in more important data fields of the metadata (e.g., title, actor name, director, writer, etc.), as opposed to less important data fields (e.g., plot synopsis or summary of the video).

Some Internet video search engines, such a Hulu® or Netflix® or YouTube® or Amazon®, allow a user to search for a video by term or keyword and then, once a particular video has been selected by a user, such search engines present a handful of other videos that may also be of interest to the user based on viewing or purchasing habits of users who also previously selected the same particular video—this is one type of "latent feature" search that presents results based on user interaction, user activity information, or collaborative filtering (such as, in a non-limiting example, user ratings).

There remains a need, however, for more powerful and intelligent search capabilities that take advantage of rich metadata and latent feature information associated with available digital media assets to generate and return ranked search results that are highly relevant based on a user's search query or selection of one or more video assets that may then be used as a reference point or target for the type of video assets that are of likely interest to the user or group of users.

The present inventions, as described and shown in greater detail hereinafter, address and teach one or more of the above-referenced capabilities, needs, and features that would be useful for a variety of businesses and industries as described, taught, and suggested herein in greater detail.

SUMMARY OF THE PRESENT INVENTION

The present inventions relate generally to the navigation and searching of digital media. More particularly, the disclosed computer-implemented systems and methods determine a similarity relationship between each of a plurality of multimedia digital assets with reference to a target multimedia digital asset or search query based on blended analysis of semantic and latent features associated with the digital assets and then report to a user or group of users the multimedia digital assets that are most similar to one or more target multimedia digital assets or most responsive to the search query.

The systems and methods disclosed herein make effective use of metadata and user interaction and activity information associated with a target multimedia digital asset or user search query to identify and present multimedia digital assets that are closest to the user's requested content. The systems and methods disclosed herein effectively blend semantic similarity, as represented by metadata associated with content assets, and latent similarity, as represented by user interaction and activity information (such as, in a non-limiting example, user ratings). Semantic similarity is presented as a result of information retrieval of metadata associated with content, and latent similarity is presented as a result of collaborative filtering. The search query, comparison analysis, and presentation of search results may be initiated as an anonymous function call and may be considered user-agnostic. The initial matching of content assets is performed as a semantic search through the use of the metadata associated with content accessible to the system. Collaborative filtering (latent) data may include explicit or implicit feedback data from users developed by a proprietary rating and recommendation engine. This feedback data, as well as other latent data from commercial and social network recommendation sites such as, in a non-limiting example, user ratings, user interaction with content, user activity when viewing content and other feedback, is preferably blended with information retrieval (semantic) search results until a pre-determined numerical blend of semantic and latent data is achieved. Upon reaching the pre-determined numerical blend of semantic and latent data, the optimum point for reporting item similarity to a user has been achieved and recommended content as identified by the content item similarity may be reported to a user.

In a first aspect, a system or method for determining and reporting a similarity relationship between a plurality of multimedia digital assets and a target multimedia digital asset is disclosed. In this first aspect, the system or method includes: accepting a search query from a user or group of users, creating a normalized semantic feature vector associated with the accepted search query, discovering the target multimedia digital asset based on the normalized semantic feature vector, generating a normalized latent feature vector associated with the discovered target multimedia digital asset, comparing the normalized semantic feature vector with semantic feature vectors retrieved from a semantic feature vector database for each of the plurality of multimedia digital assets to generate a semantic comparison value between each of the plurality of multimedia digital assets and the discovered target multimedia digital asset, comparing the normalized target latent feature vector with latent feature vectors retrieved from a latent feature vector database for each of the plurality of multimedia digital assets to generate a latent comparison value between each of the plurality of multimedia digital assets and the discovered target multimedia digital asset, blending the semantic comparison vector value with the latent feature comparison vector value for each of the plurality of multimedia digital assets to create a target comparison value for each of the plurality of multimedia digital assets, and reporting a pre-determined number of multimedia digital assets having the highest target comparison values above a pre-set threshold value to the user or group of users.

In a feature, the search query includes one or more terms associated with semantic features of the multimedia digital assets. Preferably, the semantic features include metadata associated with the multimedia digital assets. In some embodiments, the metadata is rich or time-based. In an exemplary embodiment, the metadata includes one or more of: title, creation date, director, producer, writer, production studio, actors, characters, dialog, subject matter, genre, objects, settings, locations, themes, and legal clearance to third party copyrighted material associated with the multimedia digital assets.

In another feature, the step of creating the normalized semantic feature vector includes one or more of: tokenizing the one or more terms, stemming the one or more terms, identifying synonyms for the one or more terms, lower-casing the one or more terms, spell correcting the one or more terms, creating a searchable index of the one or more terms, and creating a searchable inverted index of the one or more terms.

In yet a further feature, the search query is generated in response to selection of one or more digital media assets by the user or group of users.

In another feature, the step of generating the normalized latent feature vector associated with the discovered target multimedia digital asset includes collecting user-based information associated with the discovered target multimedia digital asset. Preferably, the user-based information associated with the discovered target multimedia digital asset includes one or more of the following: user ratings, explicit user feedback, implicit user feedback, user recommendations, user interaction, user activity, and user reviews.

In a further feature, latent feature vectors are generated for each multimedia digital asset by factorizing a latent feature array of all users and multimedia digital assets available to the system to create a matrix associating user-based information with each respective one of the multimedia digital assets available to the system. Preferably, the step of factorizing comprises use of one or more of the following collaborative algorithms: Alternating Least Squares (ALS), Bayesian Networks, Clustering models, Latent Semantic models, Singular Value Decomposition, Probabilistic Latent Semantic Analysis, Multiple Multiplicative Factor, Latent Dirichlet Allocation, Markov Decision Processes, proprietary Stemming, and proprietary Tokenizing.

In another feature, the step of generating the normalized latent feature vector associated with the discovered target multimedia digital asset includes collecting user-based information associated with one or more terms included in the search query.

In yet a further feature, the step of blending the semantic comparison vector value with the latent feature comparison vector value to create the target comparison value for each of the plurality of multimedia digital assets comprises equally weighing the semantic comparison vector value and the latent feature comparison vector value. In an alternative embodiment, the step of blending the semantic comparison vector value with the latent feature comparison vector value to create the target comparison value for each of the plurality of multimedia digital assets comprises more heavily weighing one of the semantic comparison vector value and the latent feature comparison vector value.

In another feature, identification of the target multimedia digital asset includes the step of receiving a search request for multimedia digital asset similar to the target multimedia digital asset.

In further features, the step of reporting the pre-determined number of multimedia digital assets having the highest target comparison values identifies the multimedia digital assets most similar to the target multimedia digital asset. Alternatively, the step of reporting the pre-determined number of multimedia digital assets having the highest target comparison values identifies the multimedia digital assets most responsive to the search query. In an embodiment, the step of reporting the pre-determined number of multimedia digital assets having the highest target comparison values comprises presenting the multimedia digital assets in ranked order to the user or group of users.

In a second aspect, a system for determining and reporting a similarity relationship between a plurality of multimedia digital assets and a target multimedia digital asset is disclosed. In this second aspect, the system comprises a processor and a computer program product that includes a computer-readable medium that is usable by the processor, the medium having stored thereon a sequence of instructions that when executed by the processor causes the execution of the steps of accepting a search query from a user or group of users, creating a normalized semantic feature vector associated with the accepted search query, discovering the target multimedia digital asset based on the normalized semantic feature vector, generating a normalized latent feature vector associated with the discovered target multimedia digital asset, comparing the normalized semantic feature vector with semantic feature vectors retrieved from a semantic feature vector database for each of the plurality of multimedia digital assets to generate a semantic comparison value between each of the plurality of multimedia digital assets and the discovered target multimedia digital asset, comparing the normalized target latent feature vector with latent feature vectors retrieved from a latent feature vector database for each of the plurality of multimedia digital assets to generate a latent comparison value between each of the plurality of multimedia digital assets and the discovered target multimedia digital asset, blending the semantic comparison vector value with the latent feature comparison vector value for each of the plurality of multimedia digital assets to create a target comparison value for each of the plurality of multimedia digital assets, and reporting a pre-determined number of multimedia digital assets having the highest target comparison values above a pre-set threshold value to the user or group of users.

In a feature, the search query includes one or more terms associated with semantic features of the multimedia digital assets. Preferably, the semantic features include metadata associated with the multimedia digital assets. In some embodiments, the metadata is rich or time-based. In an exemplary embodiment, the metadata includes one or more of: title, creation date, director, producer, writer, production studio, actors, characters, dialog, subject matter, genre, objects, settings, locations, themes, and legal clearance to third party copyrighted material associated with the multimedia digital assets.

In another feature, the step of creating the normalized semantic feature vector includes one or more of: tokenizing the one or more terms, stemming the one or more terms, identifying synonyms for the one or more terms, lowercasing the one or more terms, spell correcting the one or more terms, creating a searchable index of the one or more terms, and creating a searchable inverted index of the one or more terms.

In yet a further feature, the search query is generated in response to selection of one or more digital media assets by the user or group of users.

In another feature, the step of generating the normalized latent feature vector associated with the discovered target multimedia digital asset includes collecting user-based information associated with the discovered target multimedia digital asset. Preferably, the user-based information associated with the discovered target multimedia digital asset includes one or more of the following: user ratings, explicit user feedback, implicit user feedback, user recommendations, user interaction, user activity, and user reviews.

In a further feature, latent feature vectors are generated for each multimedia digital asset by factorizing a latent feature array of all users and multimedia digital assets available to the system to create a matrix associating user-based information with each respective one of the multimedia digital assets available to the system. Preferably, the step of factorizing comprises use of one or more of the following collaborative algorithms: Alternating Least Squares (ALS), Bayesian Networks, Clustering models, Latent Semantic models, Singular Value Decomposition, Probabilistic Latent Semantic Analysis, Multiple Multiplicative Factor, Latent Dirichlet Allocation, Markov Decision Processes, proprietary Stemming, and proprietary Tokenizing.

In another feature, the step of generating the normalized latent feature vector associated with the discovered target multimedia digital asset includes collecting user-based information associated with one or more terms included in the search query.

In yet a further feature, the step of blending the semantic comparison vector value with the latent feature comparison vector value to create the target comparison value for each of the plurality of multimedia digital assets comprises equally weighing the semantic comparison vector value and the latent feature comparison vector value. In an alternative embodiment, the step of blending the semantic comparison vector value with the latent feature comparison vector value to create the target comparison value for each of the plurality of multimedia digital assets comprises more heavily weighing one of the semantic comparison vector value and the latent feature comparison vector value.

In another feature, identification of the target multimedia digital asset includes the step of receiving a search request for multimedia digital asset similar to the target multimedia digital asset.

In further features, the step of reporting the pre-determined number of multimedia digital assets having the highest target comparison values identifies the multimedia digital assets most similar to the target multimedia digital asset. Alternatively, the step of reporting the pre-determined number of multimedia digital assets having the highest target comparison values identifies the multimedia digital assets most responsive to the search query. In an embodiment, the step of reporting the pre-determined number of multimedia digital assets having the highest target comparison values comprises presenting the multimedia digital assets in ranked order to the user or group of users.

In a third aspect, a system for determining and reporting a similarity relationship between a plurality of multimedia digital assets and a target multimedia digital asset is disclosed. The system comprises receiving, at a user interface, a search query from a user or group of users, using a computer processor in electronic communication with the user interface, creating a normalized semantic feature vector associated with the search query, discovering the target multimedia digital asset based on the normalized semantic feature vector, and generating a normalized latent feature vector associated with the discovered target multimedia digital asset, storing, in a semantic feature vector database, semantic feature vectors associated with each of the plurality of multimedia digital assets, storing, in a latent feature vector database, latent feature vectors associated with each of the plurality of multimedia digital assets, comparing the normalized semantic feature vector with semantic feature vectors retrieved from the semantic feature vector database for each of the plurality of multimedia digital assets to generate a semantic comparison value between each of the plurality of multimedia digital assets and the discovered target multimedia digital asset, comparing the normalized target latent feature vector with latent feature vectors retrieved from the latent feature vector database for each of the plurality of multimedia digital assets to generate a latent comparison value between each of the plurality of multimedia digital assets and the discovered target multimedia digital asset, using the computer processor, blending the semantic comparison vector value with the latent feature comparison vector value for each of the plurality of multimedia digital assets to create a target comparison value for each of the plurality of multimedia digital assets, and reporting, at the user interface, a pre-determined number of multimedia digital assets having the highest target comparison values above a pre-set threshold value to the user or group of users.

In a feature, the search query includes one or more terms associated with semantic features of the multimedia digital assets. Preferably, the semantic features include metadata associated with the multimedia digital assets. In some embodiments, the metadata is rich or time-based. In an exemplary embodiment, the metadata includes one or more of: title, creation date, director, producer, writer, production studio, actors, characters, dialog, subject matter, genre, objects, settings, locations, themes, and legal clearance to third party copyrighted material associated with the multimedia digital assets.

In another feature, the step of creating the normalized semantic feature vector includes one or more of: tokenizing the one or more terms, stemming the one or more terms, identifying synonyms for the one or more terms, lowercasing the one or more terms, spell correcting the one or more terms, creating a searchable index of the one or more terms, and creating a searchable inverted index of the one or more terms.

In yet a further feature, the search query is generated in response to selection of one or more digital media assets by the user or group of users.

In another feature, the step of generating the normalized latent feature vector associated with the discovered target multimedia digital asset includes collecting user-based information associated with the discovered target multimedia digital asset. Preferably, the user-based information associated with the discovered target multimedia digital asset includes one or more of the following: user ratings, explicit user feedback, implicit user feedback, user recommendations, user interaction, user activity, and user reviews.

In a further feature, latent feature vectors are generated for each multimedia digital asset by factorizing a latent feature array of all users and multimedia digital assets available to the system to create a matrix associating user-based information with each respective one of the multimedia digital assets available to the system. Preferably, the step of factorizing comprises use of one or more of the following collaborative algorithms: Alternating Least Squares (ALS), Bayesian Networks, Clustering models, Latent Semantic models, Singular Value Decomposition, Probabilistic Latent Semantic Analysis, Multiple Multiplicative Factor, Latent Dirichlet Allocation, Markov Decision Processes, proprietary Stemming, and proprietary Tokenizing.

In another feature, the step of generating the normalized latent feature vector associated with the discovered target multimedia digital asset includes collecting user-based information associated with one or more terms included in the search query.

In yet a further feature, the step of blending the semantic comparison vector value with the latent feature comparison vector value to create the target comparison value for each of the plurality of multimedia digital assets comprises equally weighing the semantic comparison vector value and the latent feature comparison vector value. In an alternative embodiment, the step of blending the semantic comparison vector value with the latent feature comparison vector value to create the target comparison value for each of the plurality of multimedia digital assets comprises more heavily weighing one of the semantic comparison vector value and the latent feature comparison vector value.

In another feature, identification of the target multimedia digital asset includes the step of receiving a search request for multimedia digital asset similar to the target multimedia digital asset.

In further features, the step of reporting the pre-determined number of multimedia digital assets having the highest target comparison values identifies the multimedia digital assets most similar to the target multimedia digital asset. Alternatively, the step of reporting the pre-determined number of multimedia digital assets having the highest target comparison values identifies the multimedia digital assets most responsive to the search query. In an embodiment, the step of reporting the pre-determined number of multimedia digital assets having the highest target comparison values comprises presenting the multimedia digital assets in ranked order to the user or group of users.

Embodiments of the invention can be implemented in digital electronic circuitry, or in computer hardware, firmware, software, or in combinations of one or more of the above. The invention, systems, and methods described herein may be implemented as a computer program product, i.e., a computer program tangibly embodied in an information carrier, e.g., in a machine-readable storage device or in a propagated signal, for execution by, or to control the operation of, data processing apparatuses, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps described herein can be performed by one or more programmable processors executing a computer program to perform functions or process steps or provide features described herein by operating on input data and generating output. Method steps can also be performed or implemented, in association with the disclosed systems, methods, and/or processes, in, as, or as part of special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with an end user, the invention can be implemented on a computer or computing device having a display, e.g., a cathode ray tube (CRT) or liquid crystal display (LCD) monitor or comparable graphical user interface, for displaying information to the user, and a keyboard and/or a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The inventions can be implemented in computing systems that include a back-end component, e.g., a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network, whether wired or wireless. Examples of communication networks include a local area network (LAN) and a wide area network (WAN), e.g., the Internet, Intranet using any available communication means, e.g., Ethernet, Bluetooth, etc.

The computing system can include clients and servers. A client and server are generally remote from each other and typically interact through a communication network. The relationship of client and server arises by virtue of computer programs running on the respective computers and having a client-server relationship to each other.

The present invention also encompasses computer-readable medium having computer-executable instructions for performing methods, steps, or processes of the present invention, and computer networks and other systems that implement the methods, steps, or processes of the present invention.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not necessarily intended to identify all key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present inventions will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

Figure 1:
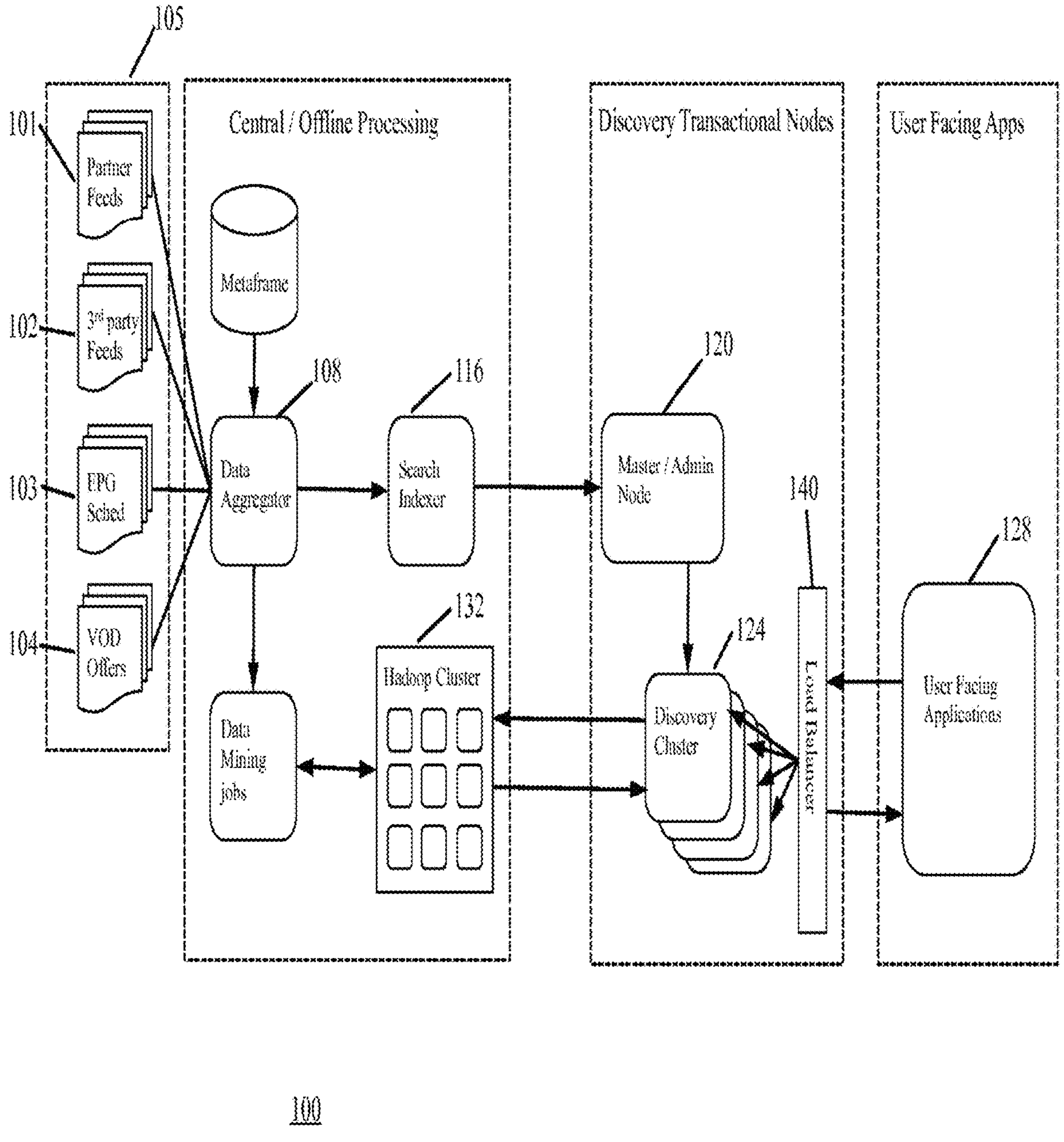
FIG. 1 presents an exemplary view of the process components consistent with an embodiment of the invention.

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances in which the event or circumstance occurs and instances where it does not.

Throughout the description and claims of this specification, the word "comprise" and variations of the word, such as "comprising" and "comprises," mean "including but not limited to," and is not intended to exclude, for example, other components, integers, elements, features, or steps. "Exemplary" means "an example of" and is not necessarily intended to convey an indication of preferred or ideal embodiments. "Such as" is not used in a restrictive sense, but for explanatory purposes only.

Disclosed herein are components that can be used to perform the herein described methods and systems. These and other components are disclosed herein. It is understood that when combinations, subsets, interactions, groups, etc. of these components are disclosed that while specific reference to each various individual and collective combinations and permutation of these may not be explicitly disclosed, each is specifically contemplated and described herein, for all methods and systems. This applies to all aspects of this specification including, but not limited to, steps in disclosed methods. Thus, if there are a variety of additional steps that can be performed, it is understood that each of the additional steps can be performed with any specific embodiment or combination of embodiments of the disclosed methods and systems.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices, and the like. An exemplary computer system is described below.

Embodiments of the methods and systems are described below with reference to block diagrams and flowchart illustrations of methods, systems, apparatuses and computer program products. It will be understood that each block of the block diagrams and flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an exemplary implementation, item similarity is a measure of how similar two items are to each other. Similarity can be measured in many different ways, for example the similarity between two digital media assets may be based upon semantic features, such as the same actor or the same genre for each of the two assets, or the similarity between two digital media assets may be based upon latent features associated with such digital media assets as the results of a model-based collaborative filtering query. However, implementing a blended approach of semantic term similarity and latent feature similarity preferably enhances item similarity discovery between an identified asset (or search query) and all content assets available in one or more content databases. Such discovery is expressed as a blended feature score that utilizes the results of both semantic similarity—expressed as a rating score—and latent feature similarity—also expressed as a rating score—to calculate the blended feature score. This blended feature score provides a similarity score that may be used to locate and rank all digital media assets from one or more content databases in order of similarity in response to a specific user search query or one or more video assets, selected by the user, to be used as a target or reference point as input to a query operation.

Turning now to FIG. 1, one exemplary implementation of the system 100 for the accumulation and dissemination of multimedia digital content associated with metadata against which queries may be processed to determine item similarity between two or more digital media assets. The digital media assets and associated metadata may be input from any number of input sources 105, including partner content feeds, metadata tagging operations, existing metadata transmitted from one or more content databases (such as, in a non-limiting example, a Video on Demand (VOD) database source), Electronic Programming Guide data, or from $3^{rd}$ party sources (201, 202, 203, 204). Preferably, for any specific multimedia digital content, the present system provides support for multiple types of metadata associated with the digital content, including common attributes of the digital content that may be provided by the owner of the digital media, system-generated time-based metadata, and custom-defined tracks of time-based metadata. The system provides support for managing video metadata through the storage and manipulation of "segments." Segments that designate a span of time in a multimedia asset, such as character appearances, scene boundaries, video breaks or ad cues, are collected together in groups known as "tracks." A digital asset can have multiple metadata tracks that each span several different types of data, but can be stored and represented in a consistent manner. A segment represents a particular type of data that occurs at a point in time or span of time within a digital asset. Examples of a segment include the window of time in which a character appears in a scene or where a studio owns the digital rights to distribute a specific clip. Any information that can be represented as a duration or instant in time can be represented as a segment. A segment may be extended to capture additional information, such as detailed character information, extended rights management information, or what type of ads to cue. A track represents a collection of one or more segments and represents the timeline of data that spans the entire duration of a video asset.

In accumulating content and metadata from various input sources 205, data normalization may be required. In a non-limiting implementation, the raw data from a $3^{rd}$ party feed may be transformed to Java Script Object Notation (JSON) format and any required fields (title, release Year, etc.) are preferably populated, although it should be understood that the raw data transformation is not restricted to JSON format only and may be implemented in additional or alternative formats. In this exemplary implementation, additional fields may also be transformed to JSON format in order to be used effectively within Free Form Search (FFS) queries, including queries being processed to determine item similarity.

The content and metadata transmitted from the various input sources 205 is combined at a content data aggregator 108 maintained within the system that accumulates incoming content and metadata associated with the incoming digital media assets into a database maintained by the content aggregator 108. The content aggregator 108 transmits all received content and associated metadata to a Search Indexer 116 software module that creates indexes and inverted indexes for all received content, processing the incoming data to produce term/segment instances that have time-based metadata parameters associated with each term/segment instance. The Search Indexer 116 transmits all processed content to a Master/Administration server node 120 to persist the processed term/segment instances and indexes and maintains the metadata for content identification, location, replication, and data security for all content. This metadata defines the set of semantic terms and features derived from the received content for each digital media asset input to the system 100. After the metadata associated with the received content has been fully normalized and indexed, the indexed content is streamed to multiple transaction nodes in one or more Discovery Clusters 124 and the Master/Administrator node 120 may manage the direction of content location and manage the operation of queries against the master index database as required to provide results to user facing applications 128.

The indexes and configuration information transmitted from the Discovery Clusters 124 includes the user interaction and user activity information associated with one or more content assets. The user interaction and user activity information preferably includes data such as user feedback information for any asset, user interaction such as selection actions (channel selection, asset selection), control requests (pause, rewind, stop, fast forward, etc.), or any other interaction that a user makes while viewing content. The user interaction and user activity information comprises the latent information about each asset that is preferably used to develop and calculate a latent information similarity score for each asset identified and/or tracked by the system.

The latent features information (derived from the user interaction and user activity information) and the semantic information (derived from the metadata associated with each content asset) is transmitted to a Hadoop cluster 132. The Hadoop cluster programming model and execution framework includes a Map/Reduce mode. Map/Reduce is a programming paradigm that expresses a large distributed computation as a sequence of distributed operations on data sets of key/value pairs. The Hadoop Map/Reduce framework harnesses a cluster of machines and executes user defined Map/Reduce jobs across the Multiple Discovery Cluster nodes 124. In addition, Hadoop's distributed file system is designed to store very large files reliably across machines in a large cluster.

Multiple Discovery Cluster nodes 124 are preferably used to store content received from the Hadoop cluster 132 and provide for a network level distributed processing environment. The content is preferably distributed in a Distributed File System (DFS) manner where all metadata and latent features associated with the content to be managed by the DFS is concatenated with metadata describing the location and replication of stored content files. The data may be stored in a distributed manner such as, in a non-limiting example, within a database distributed across a plurality of network nodes (not shown). In this exemplary implementation, the content is preferably divided into manageable blocks over as many Discovery Cluster nodes 124 as may be required to process incoming user requests in an efficient manner. A load balancer 140 module preferably reviews the distribution of search requests and queries to the set of Discovery Cluster nodes 124 and directs incoming user search requests and queries in such a manner so as to balance the amount of content stored on the set of Discovery Cluster nodes 124 as evenly as possible among the transaction nodes in the set. As more Discovery Cluster nodes 124 are added to the set, the load balancer 140 directs the incoming content to any such new transaction nodes so as to maintain the balance of requests across all of the nodes. In this manner, the load balancer 140 attempts to optimize the processing throughput for all Discovery Cluster nodes 124 such that the amount of work on any one node is reasonably similar to the amount on any other individual Discovery Cluster node 124. The load balancer 140 thus provides for search operation optimization by attempting to assure that a search operation on any one node will not require significantly greater or less time than on any other node.

Results are reported from one or more Discovery Cluster nodes 124 to the user facing application that initially generated the query request transmitted to the system.

Figure 2:
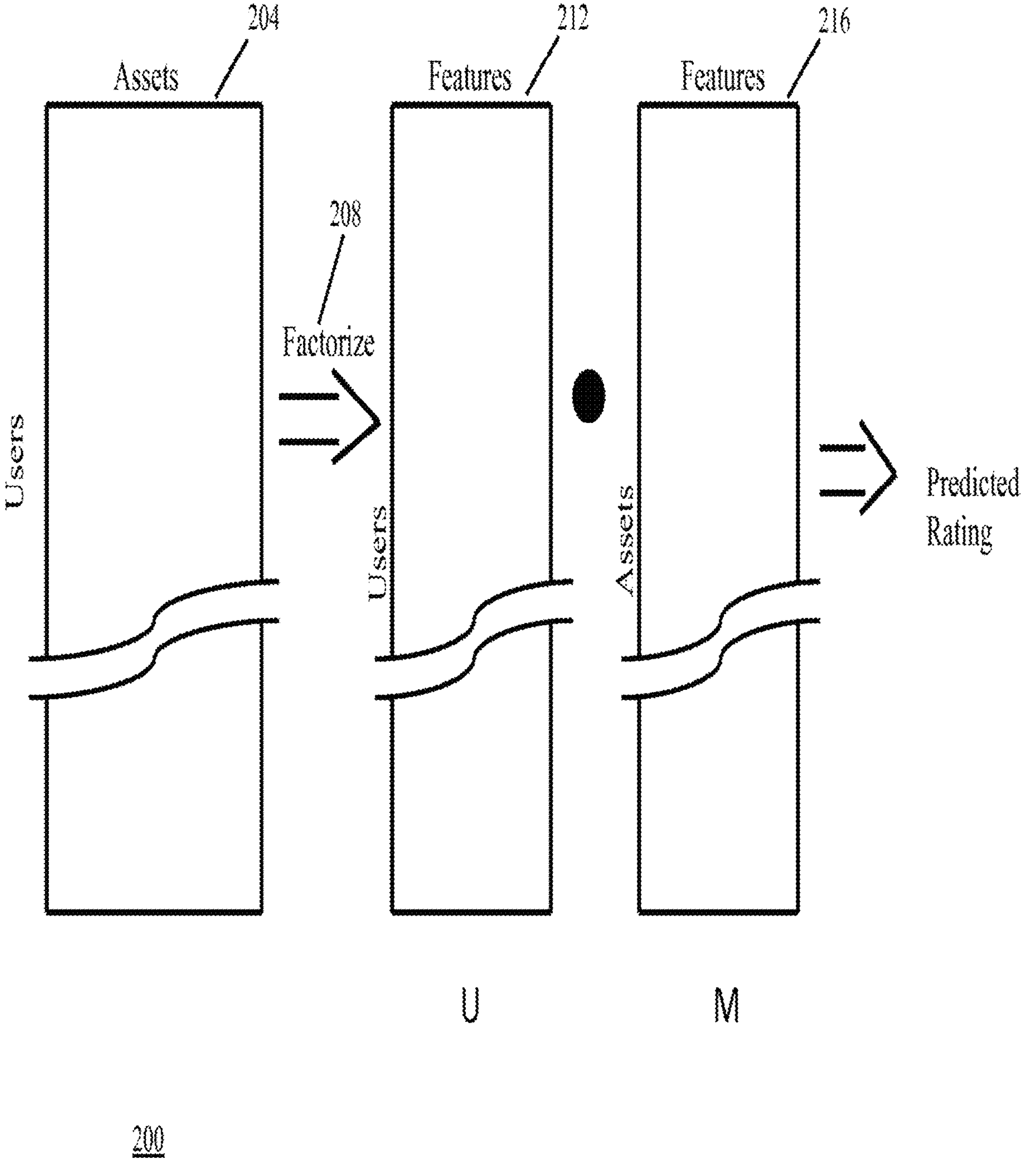
FIG. 2 presents an exemplary view of the operation to generate preferred ratings consistent with an embodiment of the invention.

FIG. 2 presents an exemplary diagram for the creation and computation of rating scores generated for latent features based on user interaction and user activity information associated with each of a large number of assets catalogued by the system. The system maintains a feature array 204 of all users known to the system and of all multimedia digital assets catalogued and tracked within the system. As will be appreciated, this feature array 204 may be very, very large due to the number of users of the system potentially being on the order of millions, or tens of millions, of users and the number of assets being on the order of hundreds of thousands of assets. The completed matrix may have a row for each user and a column for each asset. This matrix may be of variable size based upon the number of users and assets, but will be very, very large—requiring manipulation within one or more Discovery Cluster node 124, as described above.

In the exemplary embodiment, the latent feature array 204 is factorized 208 through the use of an algorithm such as an alternating least squares (ALS) function to produce two matrices, a "U matrix" 212 and an "M matrix" 216. The use of the ALS function is exemplary and should in no way be considered as limiting. Other algorithms, such as Bayesian Networks, Clustering models, Latent Semantic models, Singular Value Decomposition, Probabilistic Latent Semantic Analysis, Multiple Multiplicative Factor, Latent Dirichlet Allocation, Markov Decision Processes, proprietary Stemming, and proprietary Tokenizing, may also be used to form the U matrix 212 and the M matrix 216.

The U matrix 212 presents the latent features of all users. Each row of the U matrix 212 represents a single user (or group of users or even a single source of multiple-user input, such as a social media or video viewing website that maintains average viewer rating scores provided by the universe of website subscribers), and each column of the U matrix 212 represents each of the n number of latent feature parameters. The number of users of the U matrix 212 is the same as the number of users in the feature array 204. The U matrix 212 is not generally used for a pure similarity comparison.

The M matrix 216 presents the latent features for all assets. Each row of the M matrix 216 represents a single asset, and the M matrix 216 has a column for each of the n number of latent feature parameters. The U matrix 212 and the M matrix 216 are transmitted to the Discovery Cluster nodes 124 for further processing.

Within the Discovery Cluster nodes 124, a latent feature vector 220 for an input query is calculated by calculating the dot product of the U matrix 212 and the M matrix 216 and outputting the result as a latent feature vector 220. The latent feature vector 220 is normalized and, in a preferred embodiment, expressed as a number between 0 and 1.

Figure 3:
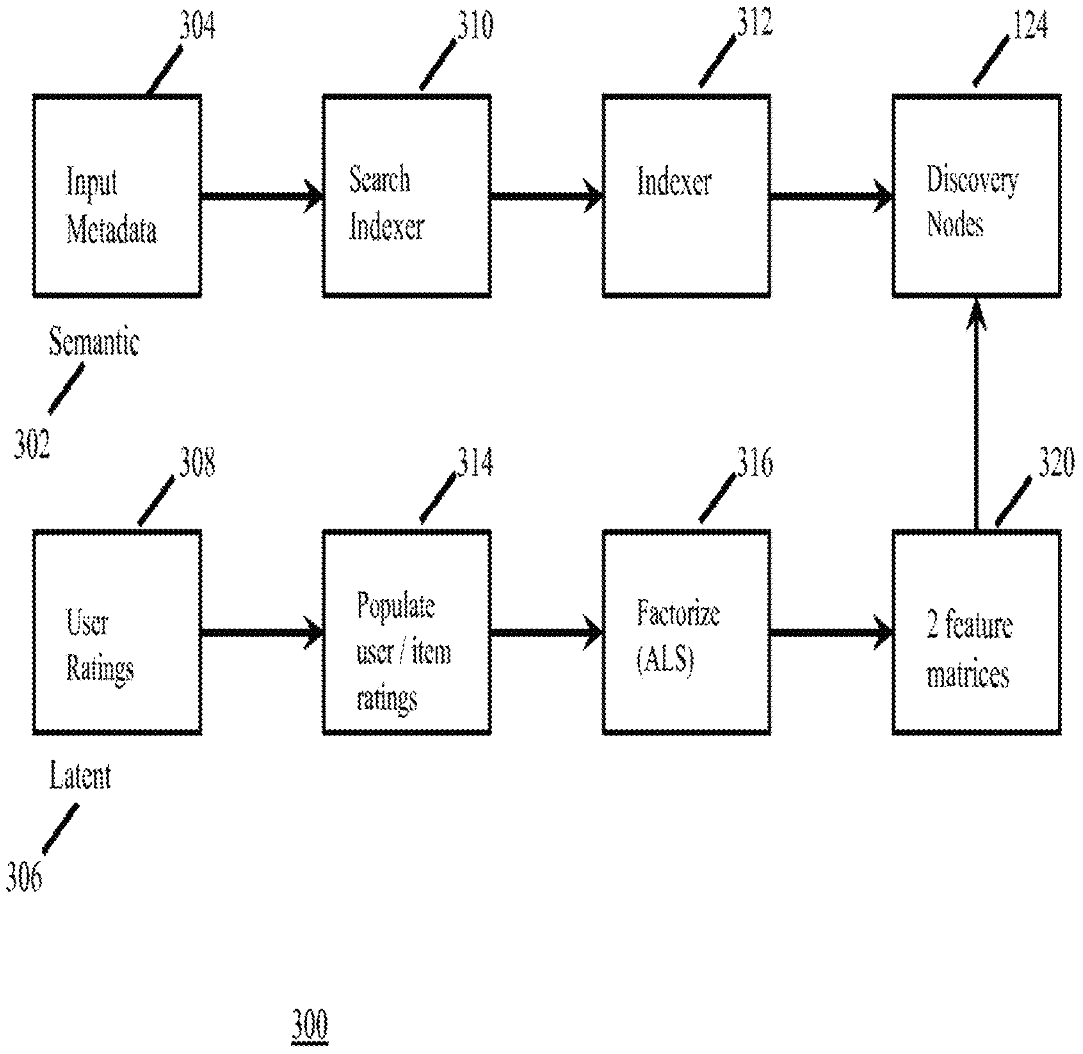
FIG. 3 presents an exemplary view of the data flow of input data to discovery nodes consistent with an embodiment of the invention.

FIG. 3 illustrates an exemplary flow chart 300 of the dual data paths used by the system 100 for processing both the semantic features 302 and the latent features 306 of each digital media asset available to the system. Such paths run from initial content input to the Discovery Cluster nodes 124. Preferably, input metadata 304 for each asset is transmitted to the search indexer 310. The search indexer computes tf/idf values for each multimedia asset in the input metadata 304. The computed values are transmitted to the indexer 312 where an inverted word index is created for the input metadata 304. These indexes are then transmitted to the Discovery Cluster nodes 124 for further processing.

Further in this exemplary embodiment, user information 308, including user activity information such as user ratings and user interaction information, are input by one or more users. The user information 308 may then be used to update and/or populate user/item ratings 314 for one or more digital media assets within the feature array 204 being tracked and maintained by the system. The latent feature array 204 is factorized 316 through the use of a collaborative filtering algorithm such as, in a non-limiting example, an alternating least squares function to produce two feature matrices 320 (the U matrix and the M matrix), as described above in FIG. 2. These matrices are transmitted to the Discovery Cluster nodes 124 for further processing. Upon the arrival at the Discovery Cluster nodes 124 of the data from both the semantic feature and latent feature data paths, the Discovery Cluster nodes 124 are prepared to process input queries based upon the most current information accumulated by the system.

Figure 4:
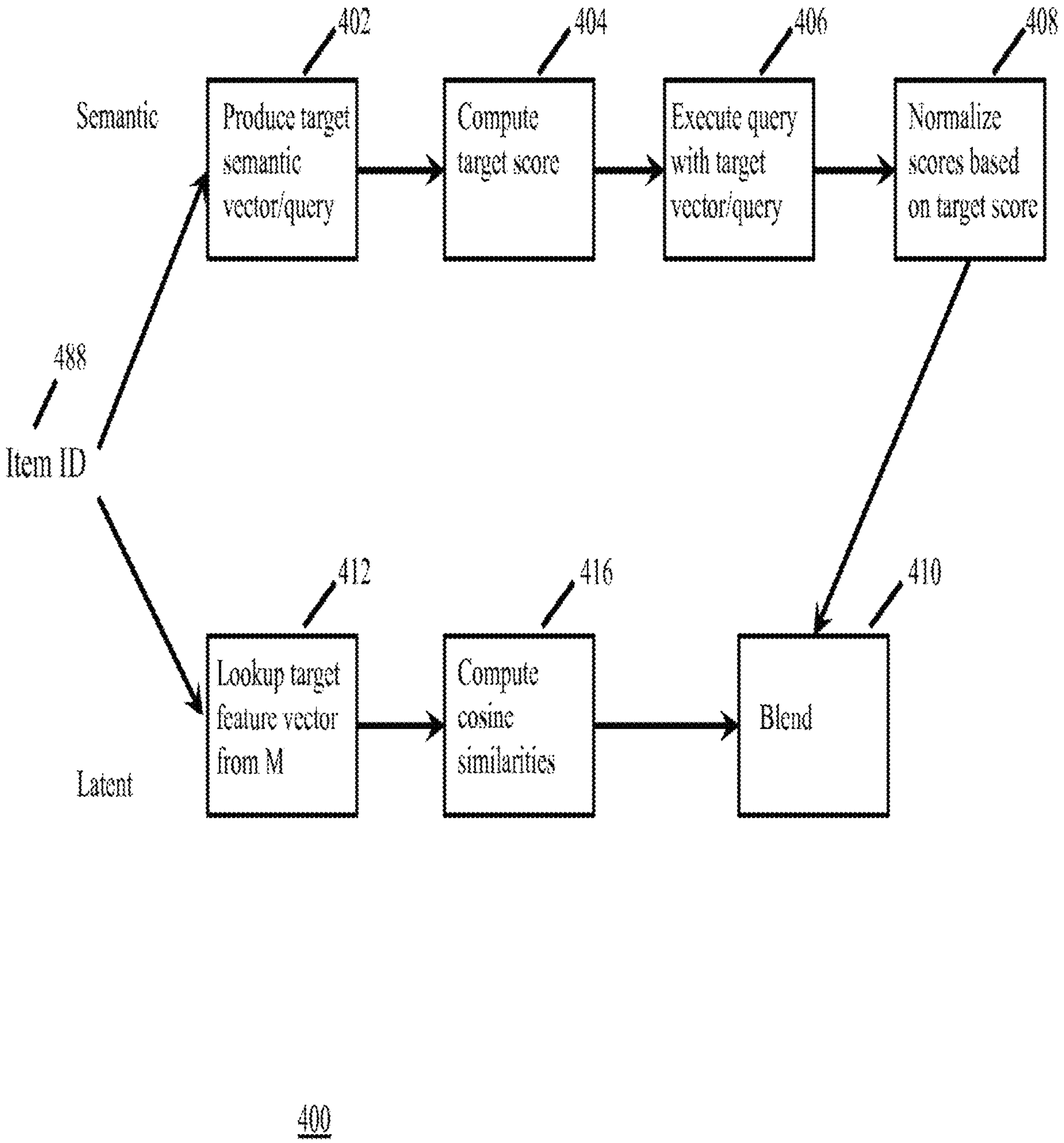
FIG. 4 presents an exemplary view of the query execution steps consistent with an embodiment of the invention.

FIG. 4 illustrates an exemplary process 400 for calculating and generating normalized semantic feature vectors and normalized latent feature vectors associated with a search query (or input item) received from a user or group of users. The search query may represent an actual search request input by a user or group of users or it may represent one or more digital media assets that have been selected or chosen as a target or referenced asset used for search purposes—likely representing an asset or group of assets in which the user has indicated an interest. This search query can then be used to identify other similar multimedia digital assets being tracked, maintained, or otherwise accessible by the system and that are highly likely to be of interest to the user of group of users.

Preferably, an item ID 488, associated with the search query, is input to the system to begin the query analysis and comparison process of the system. The system creates a normalized semantic feature vector and a normalized latent feature vector associated with the search query that can then be used for comparison purposes with semantic feature vectors and latent feature vectors associated with each of the multimedia digital assets being tracked, maintained, or otherwise accessible by the system. At step 402 the input metadata associated with the input item (based on the item ID 488) produces a target semantic vector (or query) for the semantic content of the input item. The target semantic vector is then used to compute a target score at step 404. A Lucene® query is executed with the target vector as the input to the query. This executed query compares the target vector to each other item vector in the database by calculating a similarity score between the input item and all metadata features associated with content assets in the searchable databases available to the system to produce a score for each item vector at 406. At 408 the system then normalizes the scores for all item vectors based upon the previously calculated target score to produce a value, preferably between 0 and 1, for each item vector. All normalized scores are then transmitted to a blend function 410 for further processing.

In this exemplary embodiment, the latent features for the input item (based on the item ID 488) are processed separately by first looking up or calculating the target latent feature vector (obtained from the factorized M matrix derived for the input item, as set forth in detail in association with FIG. 2) at step 412. The system then computes a cosine similarity between the target latent feature vector and all other latent feature vectors available to the system at step 416. The result of this cosine similarity computation produces normalized values, preferably in the range from 0 to 1, when comparing the target latent feature vector as compared to all other latent feature vectors available to the system. These values are then transmitted to the blend function at step 410.

The blend function combines the scores or values for both the semantic comparison vector and the latent features vector for the input item to produce a reportable score for the input item. Where there is little or no latent feature information, due to the lack of user interaction or user activity (such as input ratings for a content asset), the semantic similarity score provides the larger, sometimes disproportionately larger, portion of the blended score. As the amount of latent feature information increases, either through increased user activity or user interaction information, the latent feature comparison vector value contributes a greater and greater portion of the blended score. For the blend to increase the participation of the latent feature information, the number of latent feature information measurements resulting in latent score information must increase. Therefore, the blended score calculation is a function of the semantic information score, the latent feature score, and the number of latent feature information data points available to the system. The blended score is calculated as a result of a logistic blending function that takes the semantic comparison vector score, the latent feature comparison vector score, and the number of latent feature information data points available as inputs to the system. The system allows easy control and smooth blending of the semantic comparison vector score and the latent feature comparison vector score. This blended score or value preferably remains a number between 0 and 1. The score or value represents the novel blending of semantic similarity and latent similarity for content to identify resulting content assets that more accurately expresses the item similarity of such content assets with the discovered target multimedia digital asset represented by the input item.

Figure 5:
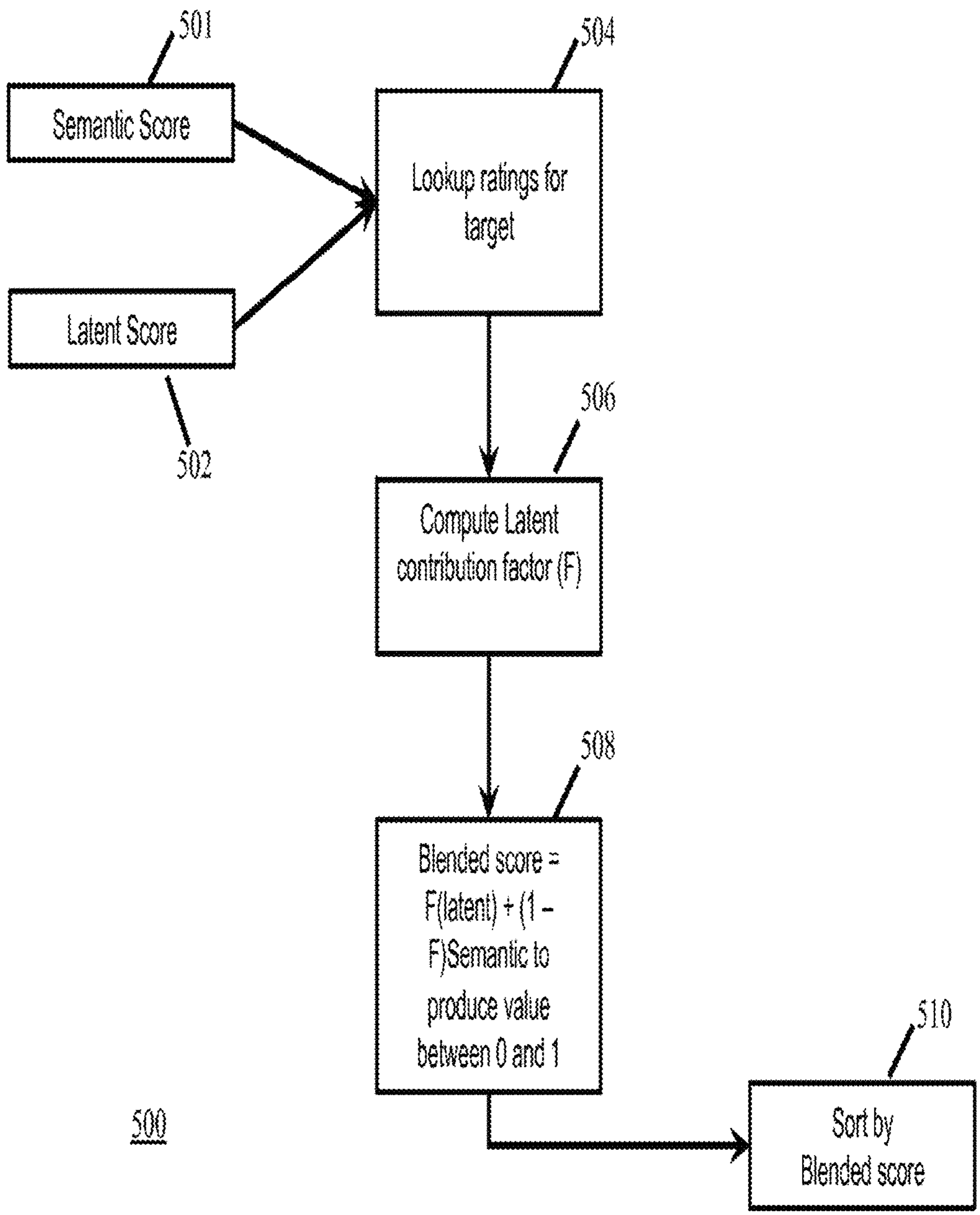
FIG. 5 presents an exemplary flow diagram for creation of a blended similarity score consistent with an embodiment of the invention.

FIG. 5 illustrates an exemplary process flow 500 for determining an appropriate blending level (or percentage) for blending semantic feature vector scores 501 and latent feature vector scores 502 for the purpose of comparing the input item with all of the multimedia digital assets being tracked, maintained, or otherwise accessible by the system. After the semantic feature vector scores 501 and latent feature vector scores 502 are transmitted to the blend function processing module (as shown in step 410 from FIG. 4), the blend function processing module performs a lookup of all user ratings and other latent feature data associated with the target item at step 504. Based on the number or amount of user ratings and other latent feature data available to the system, the processing module then calculates a latent feature contribution factor (F) at step 506, based upon a selected logistic function. In a non-limiting example, the logistic function may be chosen such that the contribution of the semantic feature vector scores 501 and the latent feature vector scores 502 follow a smooth, sigmoid curve as the population of latent feature vector scores 502 increases from zero. The contribution blend may be pre-determined to meet a particular desired blend, such as, in a non-limiting example, a 50/50 blend of the semantic feature vector scores 501 and latent feature vector scores 502. The blend is in no way limited to a 50/50 blend and may be chosen to present any desired contribution blend of the semantic and latent features. The blended score is then calculated at step 508 using the equation:

$$\text{Blended Score} = (F)\text{Latent} + (1 - F)\text{Semantic}$$

where Latent is the latent feature vector score and Semantic is the semantic feature vector score for the target item.

The calculated Blended Score for the target item and all other items are sorted by Blended Score and presented to the user in a ranked list based upon the relative value of the Blended Score at step 510.

Figure 6:
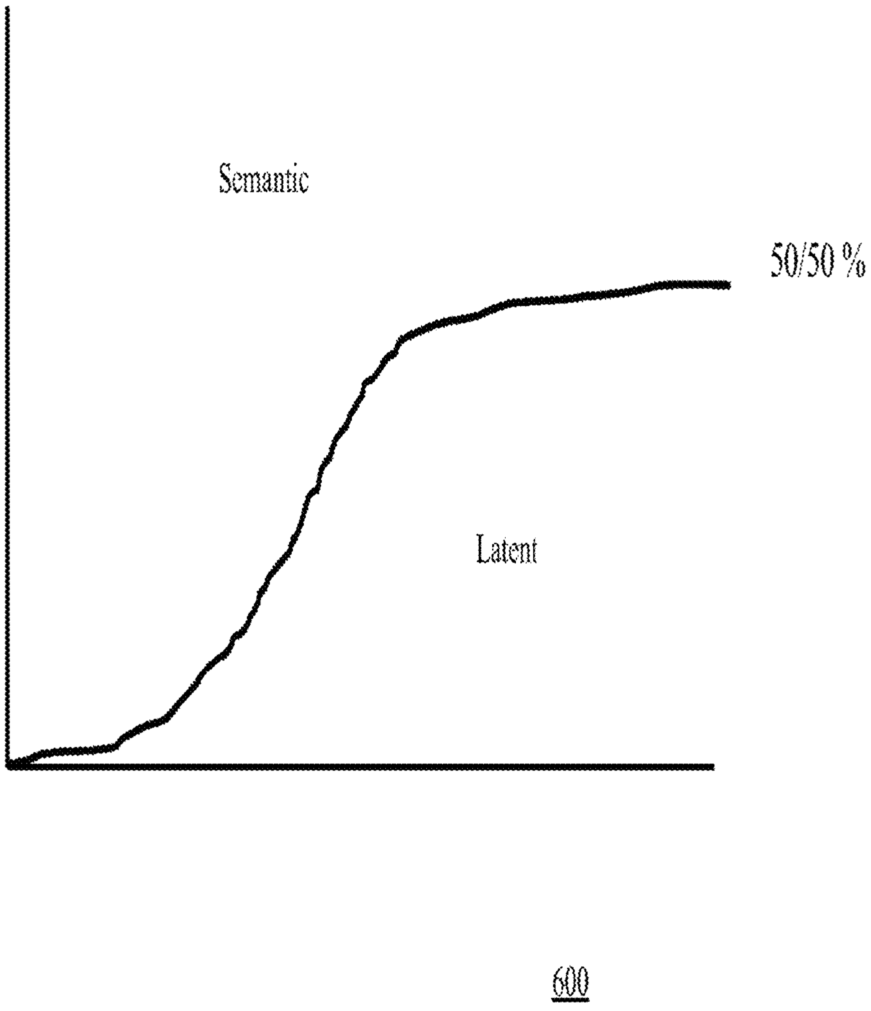
FIG. 6 presents a view of blending over time of semantic and latent scores contributing to a blended score consistent with an embodiment of the invention.

FIG. 6 presents a graphical view of the relative contribution of the semantic feature vector score and the latent feature vector score to the final blended score result 600. The blended score is presented as an exemplary sigmoid curve calculated as the result of a logistic function. In an exemplary implementation, a blended score comprising equal contributions for both semantic and latent features may present the most desirable item similarity between the item input in a user search query and all other similar multimedia digital assets being tracked, maintained, or otherwise accessible by the system. However, other contribution levels for semantic and latent features may be chosen to present differing contributions for either the semantic features or latent features for any content asset. The selection of an equal contribution of semantic and latent features is simply one non-limiting example for the similarity calculation.

In this exemplary implementation, the ideal blended score would consist of equal contributions from both semantic and latent features of the item requested. However, for a small number of latent features, the latent feature contribution, which depends upon user interaction and activity information for their creation, is generally much smaller than the semantic feature contribution. The curve presents an exemplary view of the approach to the ideal blended score consisting of a 50%/50% blend of the semantic and latent features where the number of latent feature scores begins at zero and increases over time. Initially, when an asset is first added to the database there are very few, potentially zero, user ratings for that asset. Thus, when calculating a blended similarity score for a new asset, the contribution of latent features is very low due to the lack of user interaction and activity information and the blended score is composed almost entirely of the contribution from the semantic feature score. This may tend to produce a blended score that less accurately expresses the item similarity between the target item and a new asset item. However, as more user interaction and activity data is collected for each asset and added to the database of latent features for each asset, the latent feature score comprises a greater and greater portion of the blended score. A similarity confidence level may be determined when the contribution from the latent feature scores provides enough of a contribution that the sigmoid curve shifts from being influenced more by the semantic features to being influenced in a more balanced manner between the semantic features and the latent features. This shift is called the inflection point for a particular logistic curve and represents the point at which the curve begins to trend, and curve toward, the blend level established for the result desired of the logistic function. There are generally one or more inflection points along the blended score curve that may present one or more similarity confidence threshold levels that may be reported to the user. In this non-limiting example, FIG. 6 presents a view of the curve representative of a 50/50 blend of semantic and latent features and the inflection point for this particular curve.

It is to be understood that the system and methods which have been described above are merely illustrative applications of the principles of the invention. Numerous modifications may be made by those skilled in the art without departing from the true spirit and scope of the invention.

In view of the foregoing detailed description of preferred embodiments of the present invention, it readily will be understood by those persons skilled in the art that the present invention is susceptible to broad utility and application. While various aspects have been described in the context of screen shots, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A method for arranging an order of displayed content, the method comprising:

receiving a query for content, the query associated with a user profile;

identifying, using processing circuitry, a plurality of content items with respective metadata corresponding to the query;

for each of the plurality of content items, computing, using the processing circuitry, a semantic score by comparing the respective metadata and the query;

associating, in a matrix and using the processing circuitry, the plurality of content items with a plurality of user profiles based on user viewing activity data stored at a database for the plurality of user profiles;

factorizing, using the processing circuitry, the matrix to generate two matrices, wherein a first of the two matrices represents latent features for the plurality of user profiles and a second of the two matrices represents latent features for the plurality of content items;

calculating, using the processing circuitry, a target latent feature vector by performing a dot product of the two matrices, wherein the calculating the target latent feature vector is determined using a plurality of machines connected in a large cluster that utilizes a distributed file system;

computing, using the processing circuitry, a latent score by performing a similarity comparison of the target latent feature vector and the second of the two matrices;

determining, using the processing circuitry, a first factor proportional to an amount of user viewing activity data for the user profile;

for the plurality of content items, computing, using the processing circuitry, respective combined scores by combining the latent score weighted by the first factor and a respective semantic score weighted by a second factor that is a function of the first factor, wherein as one of the first factor or the second factor increases, the other of the first factor or the second factor decreases; and causing, by the processing circuitry, to be displayed, at a display, the plurality of content items at display positions ordered based on the respective combined scores.

2. The method of claim 1, further comprising:

in response to determining that the first factor meets or exceeds a pre-determined threshold, determining a similarity confidence level.

3. The method of claim 1, wherein the user viewing activity data stored at the database for the plurality of user profiles comprises one or more of user ratings, explicit user feedback, implicit user feedback, user recommendations, user interactions, or user reviews.

4. The method of claim 1, wherein comparing the respective metadata and the query comprises:

identifying one or more keywords of the query; and comparing each of the one or more keywords to one or more terms of the respective metadata.

5. The method of claim 4, further comprising generating at least one of a searchable index or a searchable inverted index for the one or more keywords of the query.

6. The method of claim 1, wherein the target latent feature vector comprises target features corresponding to one or more of title, creation date, director, producer, writer, production studio, actors, characters, dialog, subject matter, genre, objects, settings, locations, themes, or legal clearance to third party copyrighted material associated with the query.

7. The method of claim 1, wherein computing, using the processing circuitry, the latent score comprises computing a cosine similarity of the target latent feature vector and the second of the two matrices.

8. The method of claim 1, wherein causing, by the processing circuitry, to be displayed, at the display, the plurality of content items at the display positions ordered based on the respective combined scores comprises causing to be displayed content items of the plurality of content items having highest combined scores of the respective combined scores.

9. The method of claim 1, wherein factorizing, using the processing circuitry, the matrix to generate the two matrices comprises factorizing the matrix using a collaborative filtering model.

10. The method of claim 9, wherein the collaborative filtering model comprises one or more of a Bayesian network model, a clustering model, a latent semantic model, a Probabilistic Latent Semantic Analysis model, a Latent Dirichlet Allocation model, or a Markov Decision Process model.

11. A system for arranging an order of displayed content, the system comprising:

one or more communication paths configured to receive a query; and control circuitry configured to:

receive, via the one or more communication paths, a query for content, the query associated with a user profile;

identify, using the control circuitry, a plurality of content items with respective metadata corresponding to the query;

for each of the plurality of content items, compute, using the control circuitry, a semantic score by comparing the respective metadata and the query;

associate, in a matrix and using the control circuitry, the plurality of content items with a plurality of user profiles based on user viewing activity data stored at a database for the plurality of user profiles;

factorize, using the control circuitry, the matrix to generate two matrices, wherein a first of the two matrices represents latent features for the plurality of user profiles and a second of the two matrices represents latent features for the plurality of content items;

calculate, using the control circuitry, a target latent feature vector by performing a dot product of the two matrices, wherein the calculating the target latent feature vector is determined using a plurality of machines connected in a large cluster that utilizes a distributed file system;

compute, using the control circuitry, a latent score by performing a similarity comparison of the target latent feature vector and the second of the two matrices;

determine, using the control circuitry, a first factor proportional to an amount of user viewing activity data for the user profile;

for the plurality of content items, compute, using the control circuitry, respective combined scores by combining the latent score weighted by the first factor and a respective semantic score weighted by a second factor that is a function of the first factor, wherein as one of the first factor or the second factor increases, the other of the first factor or the second factor decreases; and cause, by the control circuitry, to be displayed, at a display, the plurality of content items at display positions ordered based on the respective combined scores.

12. The system of claim 11, wherein the control circuitry is further configured to:

in response to determining that the first factor meets or exceeds a pre-determined threshold, determine a similarity confidence level.

13. The system of claim 11, wherein the user viewing activity data stored at the database for the plurality of user profiles comprises one or more of user ratings, explicit user feedback, implicit user feedback, user recommendations, user interactions, or user reviews.

14. The system of claim 11, wherein the control circuitry, when comparing the respective metadata and the query, is configured to:

identify one or more keywords of the query; and compare each of the one or more keywords to one or more terms of the respective metadata.

15. The system of claim 14, wherein the control circuitry is further configured to generate at least one of a searchable index or a searchable inverted index for the one or more keywords of the query.

16. The system of claim 11, wherein the target latent feature vector comprises target features corresponding to one or more of title, creation date, director, producer, writer, production studio, actors, characters, dialog, subject matter, genre, objects, settings, locations, themes, or legal clearance to third party copyrighted material associated with the query.

17. The system of claim 11, wherein the control circuitry, when computing the latent score, is configured to compute a cosine similarity of the target latent feature vector and the second of the two matrices and wherein factorizing the matrix to generate the two matrices comprises factorizing the matrix using a collaborative filtering model.

18. The system of claim 11, wherein the control circuitry, when causing to be displayed, at the display, the plurality of content items at the display positions ordered based on the respective combined scores, is configured to cause to be displayed content items of the plurality of content items having highest combined scores of the respective combined scores.

19. The system of claim 17, wherein the collaborative filtering model comprises one or more of a Bayesian network model, a clustering model, a latent semantic model, a Probabilistic Latent Semantic Analysis model, a Latent Dirichlet Allocation model, or a Markov Decision Process model.

20. A non-transitory computer-readable medium comprising instructions thereon that, when executed, perform a method for arranging an order of displayed content, the method comprising:

receiving a query for content, the query associated with a user profile;

identifying, using processing circuitry, a plurality of content items with respective metadata corresponding to the query;

for each of the plurality of content items, computing, using the processing circuitry, a semantic score by comparing the respective metadata and the query;

associating, in a matrix and using the processing circuitry, the plurality of content items with a plurality of user profiles based on user viewing activity data for the plurality of user profiles;

factorizing, using the processing circuitry, the matrix to generate two matrices, wherein a first of the two matrices represents latent features for the plurality of user profiles and a second of the two matrices represents latent features for the plurality of content items;

calculating, using the processing circuitry, a target latent feature vector by performing a dot product of the two matrices, wherein the calculating the target latent feature vector is determined using a plurality of machines connected in a large cluster that utilizes a distributed file system;

computing, using the processing circuitry, a latent score by performing a similarity comparison of the target latent feature vector and the second of the two matrices;

determining, using the processing circuitry, a first factor proportional to an amount of user viewing activity data for the user profile;

for the plurality of content items, computing, using the processing circuitry, respective combined scores by combining the latent score weighted by the first factor and a respective semantic score weighted by a second factor that is a function of the first factor, wherein as one of the first factor or the second factor increases, the other of the first factor or the second factor decreases; and causing, by the processing circuitry, to be displayed, at a display, the plurality of content items at display positions ordered based on the respective combined scores.

* * * * *